(12) United States Patent
Bauer et al.

(10) Patent No.: US 10,581,701 B2
(45) Date of Patent: *Mar. 3, 2020

(54) DECLARATIVE SERVICE DOMAIN FEDERATION

(71) Applicant: International Business Machines Corporation, Armonk, NY (US)

(72) Inventors: Daniel Bauer, Birmensdorf (CH); Nicholas D. Butler, Romsey (GB); Han Chen, White Plains, NY (US); Kristijan Dragicevic, Zurich (CH); Luis Garces-Erice, Zurich (CH); Gidon Gershinsky, Haifa (IL); Minkyong Kim, Scarsdale, NY (US); Hui Lei, Scarsdale, NY (US); David Rushall, Winchester (GB); Marc-Thomas H. Schmidt, Pound Ridge, NY (US); Konstantin Shagin, Haifa (IL); Hao Yang, Montrose, NY (US); Liangzhao Zeng, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 880 days.

This patent is subject to a terminal disclaimer.

(21) Appl. No.: 15/205,240

(22) Filed: Jul. 8, 2016

(65) Prior Publication Data

US 2016/0323155 A1   Nov. 3, 2016

Related U.S. Application Data

(63) Continuation of application No. 13/046,008, filed on Mar. 11, 2011, now Pat. No. 9,389,922.

(51) Int. Cl.
*H04L 12/24* (2006.01)
*G06F 9/50* (2006.01)
*H04L 29/08* (2006.01)

(52) U.S. Cl.
CPC ........ *H04L 41/5003* (2013.01); *G06F 9/5061* (2013.01); *H04L 41/0806* (2013.01); *H04L 41/5009* (2013.01); *H04L 67/2838* (2013.01)

(58) Field of Classification Search
CPC .................................................. H04L 41/5003
See application file for complete search history.

(56) References Cited

U.S. PATENT DOCUMENTS 8,429,650 B2    4/2013  Ferwerda et al.
9,389,922 B2 *  7/2016  Bauer .................. G06F 9/5061
(Continued)

OTHER PUBLICATIONS

International Search Report and Written Opinion dated Jun. 4, 2012 for International Application No. PCT/US12/27937, 12 pages.
(Continued)

*Primary Examiner* — Nicholas P Celani
(74) *Attorney, Agent, or Firm* — Stephen R. Tkacs; Stephen J. Walder, Jr.; Joseph Petrokaitis

(57) ABSTRACT

A mechanism for declarative service domain federation uses a declarative approach to both the visibility aspect and the management aspect of service domain federation. Instead of manually exporting services, that is, selecting individual services from source domains to be visible in the target domain, using the present system, a federation architect uses a federation console to specify federation intent. The federation intent may include federation rule, query-based service group, and quality-of-service (QoS) policy. Based on the declared federation intent, a planning engine resolves the individual services based on the group query, generates the service visibility configuration, and creates the necessary service proxies and/or mediation objects to satisfy the goal.
(Continued)

At runtime, a service monitor collects the performance metrics of federated services and dynamically adjusts the mediation/proxy configurations to maintain the QoS objectives specified by the federation architect.

22 Claims, 4 Drawing Sheets

(56) References Cited

U.S. PATENT DOCUMENTS

| | | | |
|---|---|---|---|
| 2003/0084198 A1* | 5/2003 | Mandal | G06F 9/465 |
| | | | 719/316 |
| 2003/0093501 A1 | 5/2003 | Carlson et al. | |
| 2004/0030421 A1* | 2/2004 | Haley | G06F 8/10 |
| | | | 700/49 |
| 2004/0128541 A1 | 7/2004 | Blakley, III et al. | |
| 2004/0220910 A1 | 11/2004 | Zang et al. | |
| 2006/0021017 A1 | 1/2006 | Hinton et al. | |
| 2006/0021019 A1 | 1/2006 | Hinton et al. | |
| 2007/0300240 A1 | 12/2007 | Viegener et al. | |
| 2008/0010665 A1 | 1/2008 | Hinton et al. | |
| 2008/0065656 A1 | 3/2008 | Theeten et al. | |
| 2008/0065683 A1 | 3/2008 | Theeten | |
| 2008/0086486 A1 | 4/2008 | Kaler et al. | |
| 2008/0209397 A1 | 8/2008 | Mohindra et al. | |
| 2008/0275935 A1* | 11/2008 | Mohindra | H04L 67/16 |
| | | | 709/201 |
| 2009/0070456 A1 | 3/2009 | Brown et al. | |
| 2009/0077251 A1 | 3/2009 | Brown et al. | |
| 2009/0106350 A1 | 4/2009 | Chen et al. | |
| 2010/0043050 A1 | 2/2010 | Nadalin et al. | |
| 2010/0274898 A1 | 10/2010 | Zuver et al. | |

OTHER PUBLICATIONS

Notification Concerning Transmittal of International Preliminary Report on Patentability (Chapter I of the Patent Cooperation Treaty), Application No. PCT/US2012/027937 dated Sep. 26, 2013, 7 pages.

Dragicevic, Kristijan et al., "DISCE: A Declarative Inter-ESB Service-Connectivity Configuration Engine", 2010 IEEE International Conference on Web Services, IEEE, Jul. 5-10, 2010, pp. 489-496.

Ye, Lei, "Discovering Web Services Based on Functional Semantics", IEEE, 2006, 8 pages.

U.S. Appl. No. 13/046,008.

* cited by examiner

DECLARATIVE SERVICE DOMAIN FEDERATION

BACKGROUND

The present application relates generally to an improved data processing apparatus and method and more specifically to mechanisms for declarative service domain federation.

Service-oriented architecture (SOA) is a flexible set of design principles used during the phases of systems development and integration in computing. A system based on a SOA will package functionality as a suite of interoperable services that can be used within multiple separate systems from several business domains. SOA also generally provides a way for consumers of services, such as Web-based applications, to be aware of available SOA-based services. For example, several disparate departments within a company may develop and deploy SOA services in different implementation languages; their respective clients will benefit from a well understood, well defined interface to access them.

Service-orientation requires loose coupling of services with operating systems, and other technologies that underlies applications. SOA separates functions into distinct units, or services, which developers make accessible over a network in order to allow users to combine and reuse them in the production of applications. These services and their corresponding consumers communicate with each other by passing data in a well-defined, shared format, or by coordinating an activity between two or more services.

SOA has seen rapid adoption in enterprise computing. One main advantage of SOA is service reuse. This is enabled through connectivity between service consumers and service providers. Connectivity middleware such as Enterprise Service Bus (ESB) provides four basic principles of connectivity: visibility, management, security, and governance.

Traditionally, the deployment of SOA has started with individual business units. The services with a particular business unit, the associated connectivity middleware, and necessary service registry and repository form what is called a service domain. The incremental nature of SOA adoption typically results in islands of service domains that are not connected. To enable greater service reuse and to scale up the SOA scope, it is highly desirable to have federated connectivity among the service domains. A federated service domain effectively connects these islands of SOA together to form an enterprise-spanning SOA.

SUMMARY

In one illustrative embodiment, a method, in a federation server data processing system, for declarative service domain federation comprises receiving, in a planning engine of the federation server data processing system, one or more federation rules, one or more quality-of-service policies, and one or more service group definitions. The method further comprises identifying, by the planning engine, a set of services based on the service group definition. The method further comprises generating, by the planning engine, a service visibility configuration and one or more service proxies based on the federation rule and the quality-of-service policy. The method further comprises deploying, by the federation server, the visibility configuration to one or more service domains comprising the individual services. The method further comprises deploying, by the federation server, the one or more service proxies to connectivity middleware of the one or more service domains.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for declarative service domain federation. The mechanism uses a declarative approach to both the visibility aspect and the management aspect of service domain federation. Instead of manually exporting services, that is, selecting individual services from source domains to be visible in the target domain, using the present system, a federation architect uses a federation console to specify federation intent. The federation intent may include federation rule, query-based service group, and quality-of-service (QoS) policy.

Based on the declared federation intent, a planning engine resolves the individual services based on the group query, generates the service visibility configuration, and creates the necessary service proxies and/or mediation objects to satisfy the goal. An automated deployment tool assists the federation architect in deploying the configuration and mediation artifacts into the underlying connectivity middleware to realize the federation intent. At runtime, a service monitor collects the performance metrics of federated services and dynamically adjusts the mediation/proxy configurations to maintain the QoS objectives specified by the federation architect.

The declarative nature of this mechanism allows a federation architect to succinctly and precisely express the federation goal without resorting to low-level specification. The mechanism saves time and reduces possible errors. Also, the mechanism of the illustrative embodiments described hereafter enables federation patterns to be created that can then be reused and applied easily when changes in the underlying service domains occur.

Figure 1:
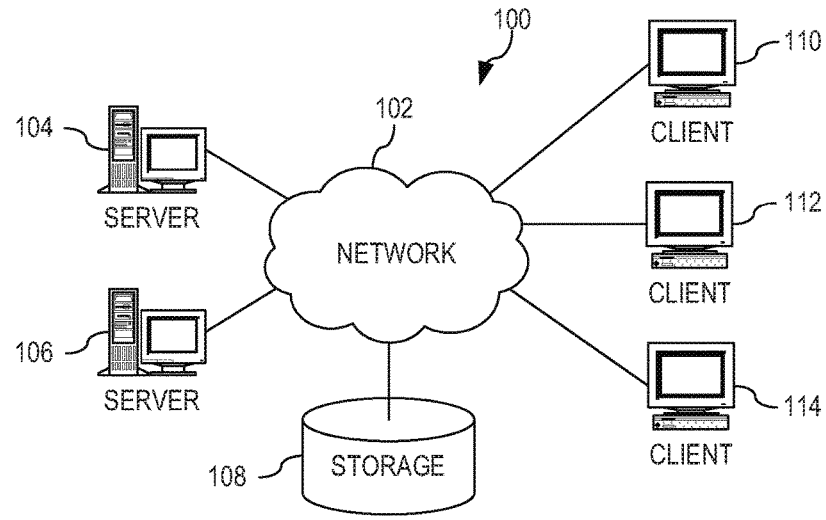
FIG. 1 depicts a pictorial representation of an example distributed data processing system in which aspects of the illustrative embodiments may be implemented.
Figure 2:
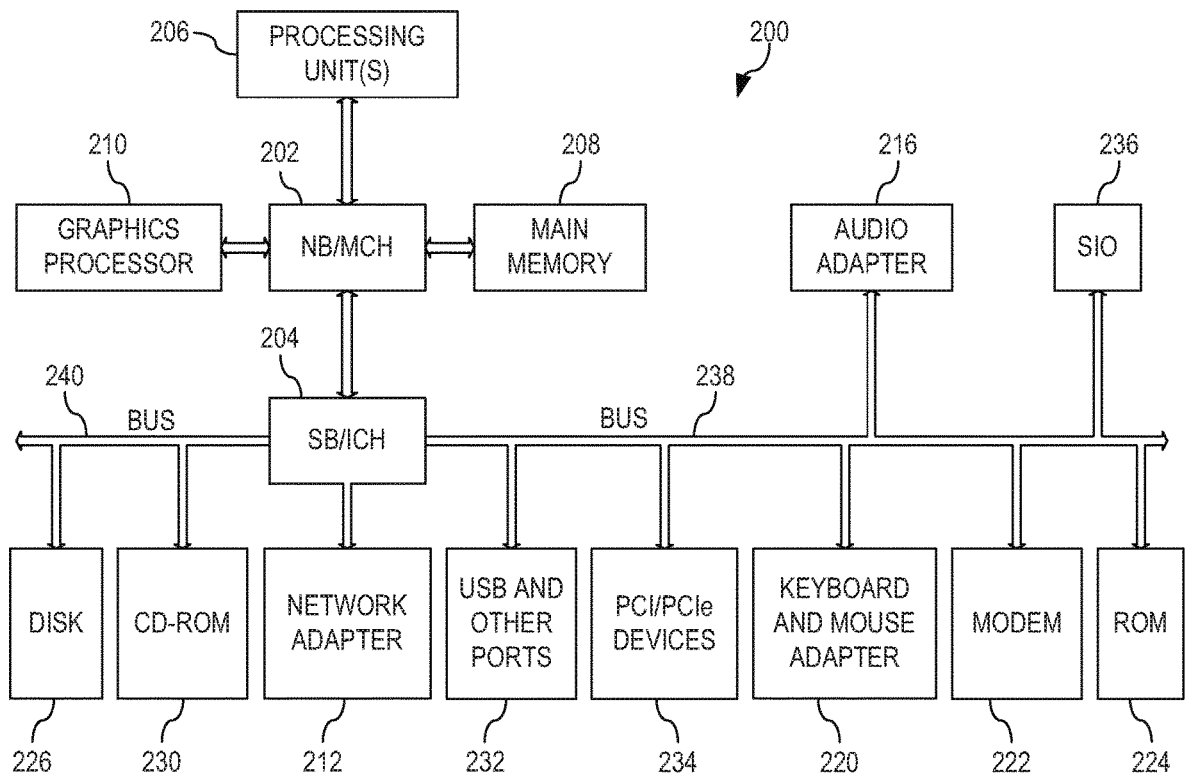
FIG. 2 is a block diagram of an example data processing system in which aspects of the illustrative embodiments may be implemented.
Figure 3:
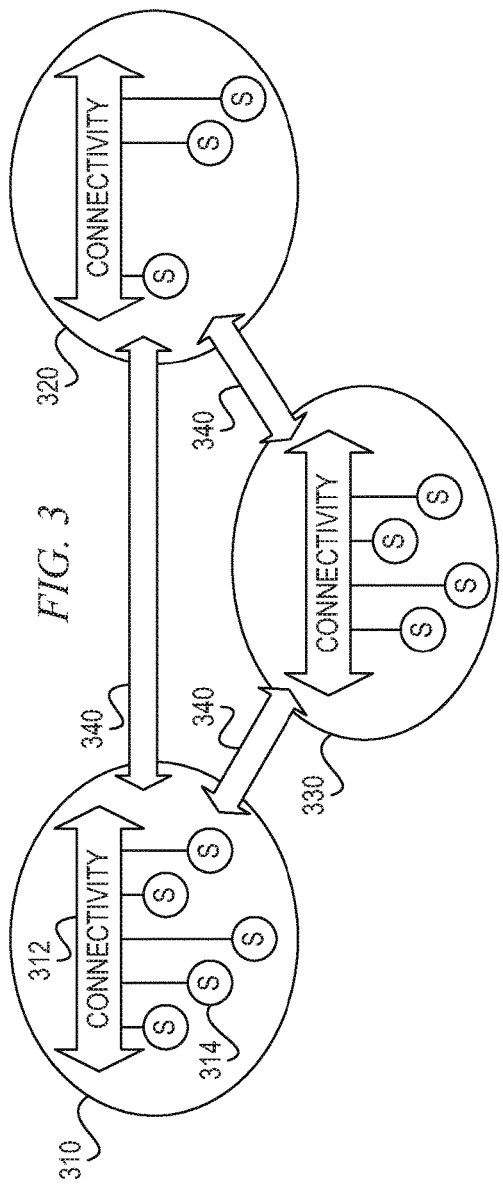
FIG. 3 is a diagram illustrating a federation of service domains using service oriented architecture (SOA) in accordance with an illustrative embodiment.

The illustrative embodiments may be utilized in many different types of data processing environments including a distributed data processing environment, a single data processing device, or the like. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateway s that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft Windows 7 (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (Java is a trademark of Oracle and/or its affiliates.).

As a server, data processing system 200 may be, for example, an IBM® eServer™ System p® computer system, running the Advanced Interactive Executive (AIX®) operating system or the LINUX operating system (IBM, eServer, System p, and AIX are trademarks of International Business Machines Corporation in the United States, other countries, or both, and LINUX is a registered trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

FIG. 3 is a diagram illustrating a federation of service domain using service oriented architecture (SOA) in accordance with an illustrative embodiment. The federation comprises service domains 310, 320, 330. Service domain 310 comprises services 314 that are connected by connectivity middleware 312. As used herein, a "service" may be a service provider or a service consumer or a combination of service provider/consumer. To enable greater service reuse and to scale up the SOA scope, federated connectivity 340 connects service domains 310, 320, 330. Federated service connectivity 340 effectively connects these islands of SOA to form an enterprise-spanning SOA.

In one solution, service domain federation focuses on the aspect of federated service visibility, that is, to enable service consumers to interact with service providers residing in different service domains. In this solution, a federation architect must manually identify services from a source domain and specify where these services should be made visible (the target domain) and how (either directly through service registry or indirectly through proxies to enable loose-coupling between domains).

The drawback of the above approach is that the federation process is highly procedural and involves manual operating procedure. The process is generally tedious and error-prone and puts a large burden on the federation architect to understand all the service domains. Furthermore, this approach handles only the federated visibility aspect, but leaves the management aspect, for example, quality of service (QoS) adaptation, largely unaddressed.

In accordance with an illustrative embodiment, a mechanism for declarative service domain federation uses a declarative approach to both the visibility aspect and the management aspect of service domain federation. Instead of manually exporting services, that is, selecting individual services from source domains to be visible in the target domain, using the present system, a federation architect uses a federation console to specify federation intent. The federation intent may include federation rule, query-based service group, and quality-of-service (QoS) policy.

Based on the declared federation intent, a planning engine resolves the individual services based on the group query, generates the service visibility configuration, and creates the necessary service proxies and/or mediation objects to satisfy the goal. An automated deployment tool assists the federation architect in deploying the configuration and mediation artifacts into the underlying connectivity middleware to realize the federation intent. At runtime, a service monitor collects the performance metrics of federated services and dynamically adjusts the mediation/proxy configurations to maintain the QoS objectives specified by the federation architect.

Those of ordinary skill in the art will appreciate that the hardware in FIGS. 1-3 may vary depending on the implementation. Other internal hardware or peripheral devices, such as flash memory, equivalent non-volatile memory, or optical disk drives and the like, may be used in addition to or in place of the hardware depicted in FIGS. 1-3. Also, the processes of the illustrative embodiments may be applied to a multiprocessor data processing system, other than the SMP system mentioned previously, without departing from the spirit and scope of the present invention.

Moreover, a data processing system may take the form of any of a number of different data processing systems including client computing devices, server computing devices, a tablet computer, laptop computer, telephone or other communication device, a personal digital assistant (PDA), or the like. In some illustrative examples, a data processing system may be a portable computing device which is configured with flash memory to provide non-volatile memory for storing operating system files and/or user-generated data, for example. Essentially, a data processing system may be any known or later developed data processing system without architectural limitation.

Figure 4:
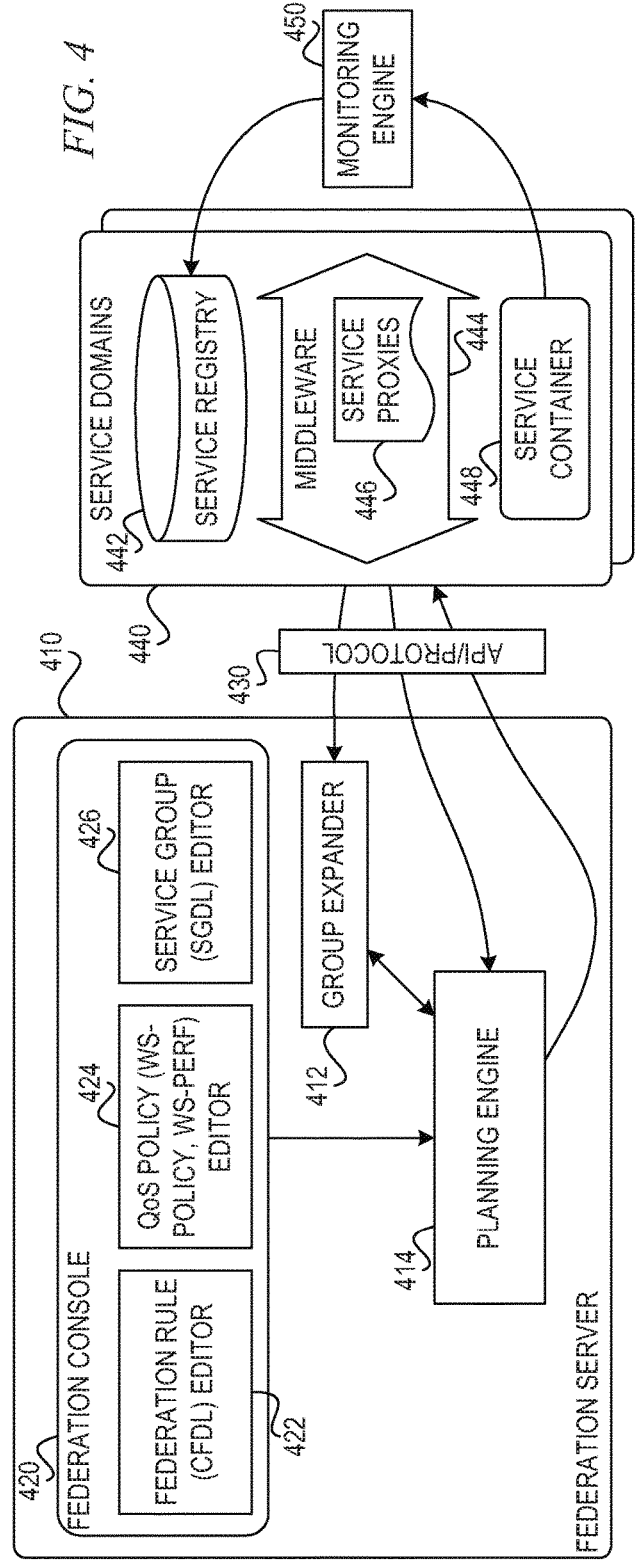
FIG. 4 is a block diagram illustrating an overall architecture for service domain federation in accordance with an illustrative embodiment.

FIG. 4 is a block diagram illustrating an overall architecture for declarative service domain federation in accordance with an illustrative embodiment. The federation architecture includes federation server 410 and a plurality of service domains 440. Federation server 410 includes federation console 420, group expander 412, and planning engine 414. Each service domain 440 includes service registry 442, connectivity middleware 444 (such as an enterprise service bus (ESB)), and one or more service containers 448.

Federation console 420 may be a Web-based administrative tool used by a federation architect to define federation rules and policies. Federation console 420 comprises three main editors, federation rule editor 422, quality-of-service (QoS) policy editor 424, and service group editor 426.

The federation architect defines the overall federation rules using the federation rule editor 422. Federation console 420 stores these rules in a textual or binary data format. In one example embodiment, federation console 420 stores the federation rules in a Connectivity Federation Definition Language (CFDL), which is described in further detail below.

The federation architect uses QoS policy editor 422 to describe the capability of existing services in the source service domains and the requirement of federated services in the target service domains. Federation console 420 stores the QoS policies in a textual or binary format. In one example embodiment, federation console 420 stores the QoS policies using a Web services (WS) performance language, a WS-Policy assertion language compatible with the WS-Policy framework, which is described in further detail below.

The federation architect uses service group editor 426 to specify the definition of service groups using a query-based structure. Federation console 420 stores the queries (group definitions) in a textual or binary format. In one example embodiment, federation console 420 stores the group definitions using a Service Group Description Language (SGDL), which is described in further detail below.

The federation rules reference QoS policies and service group definitions to allow for high flexibility and re-usable federation artifacts throughout a service domain federation lifecycle. Planning engine 414 consume federation rules, QoS policy, and service group definitions from federation rule editor 422, QoS policy editor 424, and service group editor 426, respectively. Planning engine 414 generates a federation plan consisting of visibility configuration and service proxies and/or mediation. Planning engine 414 deploys service proxies 446 to service domains 440.

In one example embodiment, visibility configuration is realized as entries in service registries 442 in the pertinent service domains 440. Planning engine 414 derives the location and type of service proxies/mediations from both QoS requirements and the underlying service capabilities. The federation profiles provide the required semantic knowledge to perform the federation task. During the planning phase, planning engine 414 may invoke group expander 412 to dynamically resolve the service group memberships.

Federation server 410 communicates with service domains 440 through an application programming interface (API) or protocol 430. In one example embodiment, the API/protocol is extended federation connectivity management (FCM). Through API/protocol 430 and using group expander 412, planning engine 414 queries service registries 442 of service domains 440 for service group memberships, and planning engine 414 deploys service proxies 446 to middleware 444. Monitoring engine 450 monitors containers 448 and populates service registry 442 with QoS capabilities.

Figure 5:
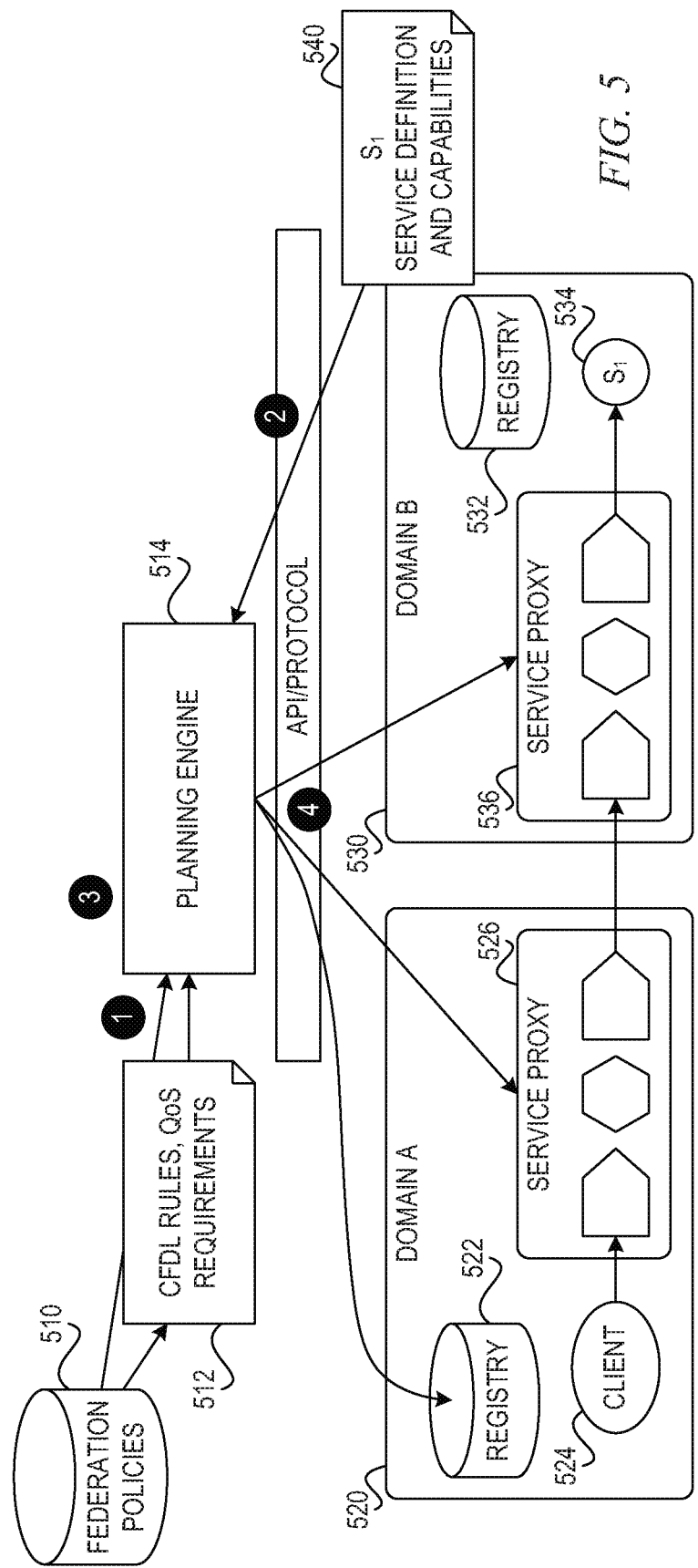
FIG. 5 is a block diagram illustrating operation of a planning engine for performing service domain federation in accordance with an illustrative embodiment.

FIG. 5 is a block diagram illustrating operation of a planning engine for performing service domain federation in accordance with an illustrative embodiment. Planning engine 514 performs service domain federation for domain A 520 and domain B 530. More particularly, domain A 520 includes registry 522 and a client 524 that may consume service $S_1$ 534 in domain B 530. Domain B 530 includes registry 532 and service $S_1$ 534. Domain B 530 also includes service definition and capabilities for service $S_1$ 540.

In step 1, planning engine 514 receives federation policies 510 and CFDL rules and QoS requirements 512. The CFDL rules and QoS requirements 512 may reference one or more of the federation policies 510. In step 2, planning engine 514 receives $S_1$ service definition and capabilities 540. Planning engine 514 generates a federation plan in step 3. Then, in step 4, planning engine 514 deploys service proxy 526 to domain A 520 and deploys service proxy 536 to domain B 530. Client 524 then may access service $S_1$ 534 through service proxy 526 in domain A 520 and service proxy 536 in domain B 530.

The connectivity federation description language (CFDL) is an example embodiment of the federation rule language. CFDL allows a federation architect to define federation patterns in a concise, abstract, and reusable form. Each rule has a simple structure comprising the following elements: verb, subject, object, and adverb. The verb is an action, for example "add" or "remove." The subject specifies a set of services using the service group construct. The object specifies a set of service domains. The adverb, or QoS policy, specifies how the federation should be carried out. The planning engine of the federation server executes these rules on a set of service domains to federate a potentially large number of services.

Figure 6:
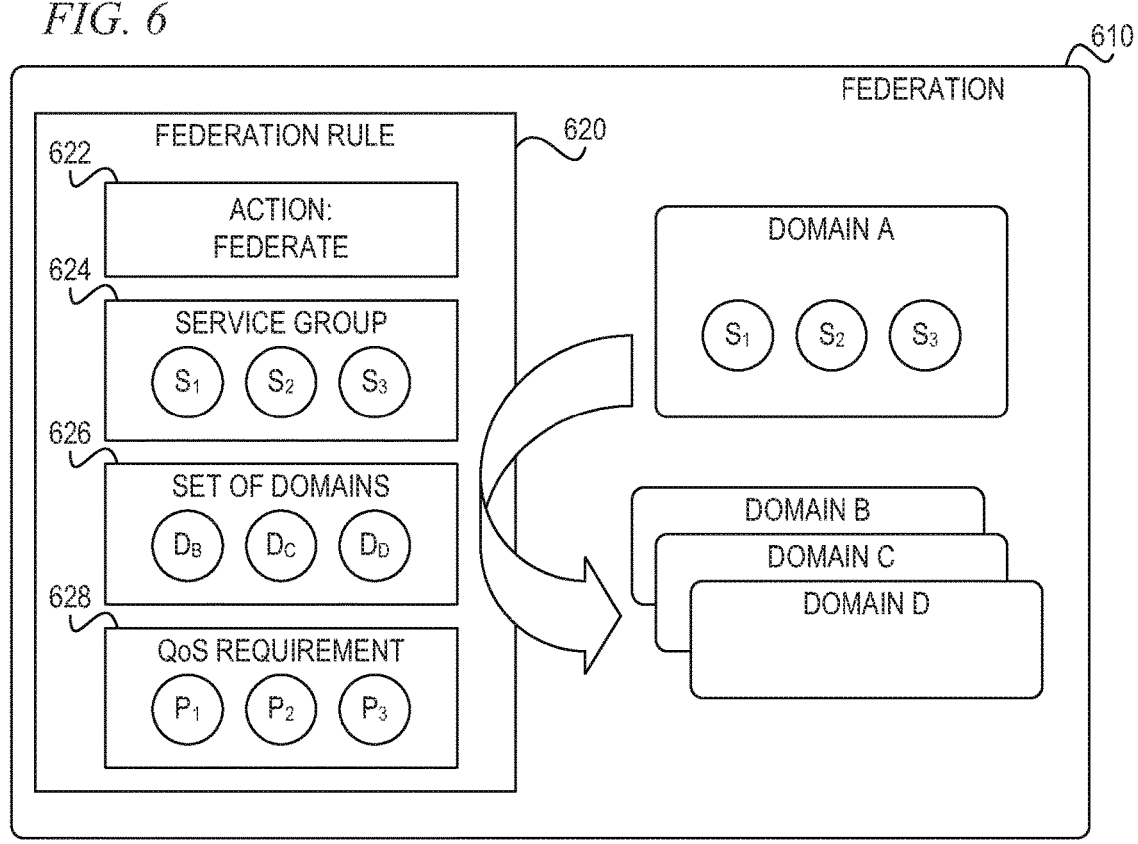
FIG. 6 is a diagram illustrating an example federation rule in accordance with an illustrative embodiment.

FIG. 6 is a diagram illustrating an example federation in accordance with an illustrative embodiment. Federation 610 includes federation rule 620. In the depicted example, federation rule 620 includes verb 622, subject 624, object 626, and ad verb 628. Verb 622 specifies an action of "federate." Subject 624 specifies a set of services: $S_1, S_2, S_3$. Object 626 specifies a set of domains: $D_B, D_C, D_D$. Adverb 628 specifies a set of QoS policies: $P_1, P_2, P_3$.

The Web services performance language is a Web services policy framework (WS-Policy) compatible assertion language that enables formal specification of performance-related Quality-of-Service (QoS) capabilities and requirements. For example, the WS-Performance language may allow the federation architect to specify latency, throughput, and availability requirements. When used to describe QoS capabilities, WS-Performance language specifies the latest service performance measurements. The performance measurements may be retrieved from the service registries, which are populated by a runtime service monitoring engine. When used to describe QoS requirements, WS-Performance language specifies a set of service level assurance and/or optimization objectives. Each objective may be specified over a complex performance indicator, which is a function of one of multiple primitive measurement metrics. Each measurement metric is associated with an attribute in the service metadata in the service registry.

Service group description language (SGDL) defines service groups for service domain federation. A service group is a collection of service endpoints defined by a) explicit enumeration, b) a query against a set of service properties, including syntactic, semantic, and quality-of-service attributes, or c) union or intersection of other service groups. Definition of service groups simplifies the federation service domain management by enabling operations at group level. These include, but are not limited to, importing services from foreign domains, exporting services to foreign domains, and specifying QoS requirements.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages. Including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be pro vided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 7:
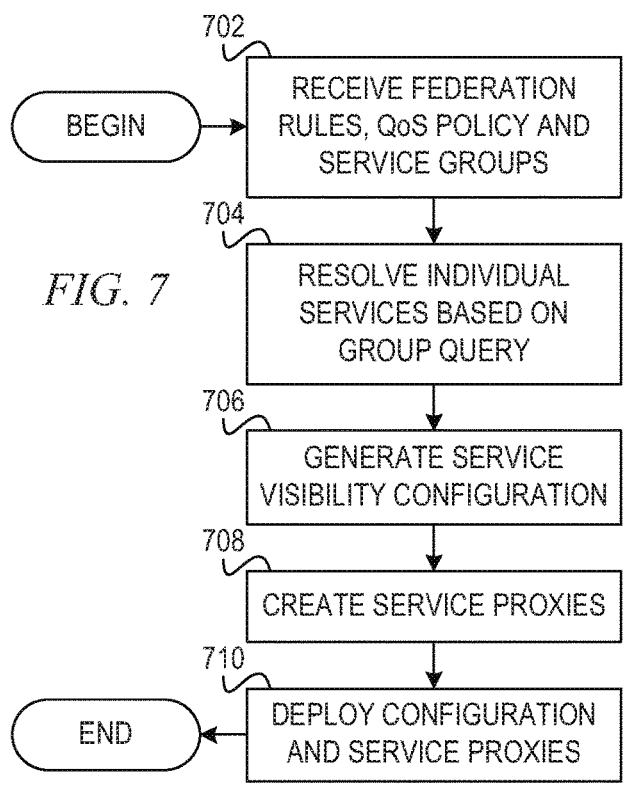
FIG. 7 is a flowchart of a federation server for service domain federation in accordance with an illustrative embodiment.

FIG. 7 is a flowchart of a federation server for service domain federation in accordance with an illustrative embodiment. Operation begins, and a planning engine of the federation server receives federation rules, QoS policy and service groups (block 702). Then, the planning engine resolves individual services based on a group query (block 704). The planning engine generates a service visibility configuration (block 706) and creates service proxies (block 708). Thereafter, the federation server deploys the visibility configuration and the service proxies (block 710), and operation ends.

Figure 8:
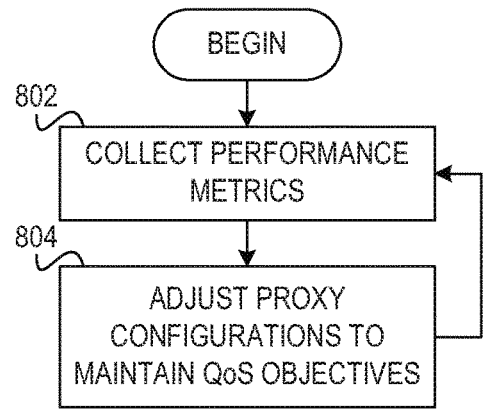
FIG. 8 is a block diagram illustrating operation of a federation server at runtime in accordance with an illustrative embodiment.

FIG. 8 is a block diagram illustrating operation of a federation sender at runtime in accordance with an illustrative embodiment. Operation begins, and the federation server collects performance metrics (block 802) and adjusts proxy configurations to maintain QoS objectives (block 804). Thereafter, operation returns to block 802. The federation server collects performance metrics and adjusts proxy configurations, repeating periodically.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for declarative service domain federation. The mechanisms use a declarative approach to both the visibility aspect and the management aspect of service domain federation. Instead of manually exporting services, that is, selecting individual services from source domains to be visible in the target domain, using the present system, a federation architect uses a federation console to specify federation intent. The federation intent may include federation rule, query-based service group, and quality-of-service (QoS) policy.

Based on the declared federation intent, a planning engine resolves the individual services based on the group query, generates the service visibility configuration, and creates the necessary service proxies and/or mediation objects to satisfy the goal. An automated deployment tool assists the federation architect in deploying the configuration and mediation artifacts into the underlying connectivity middleware to realize the federation intent. At runtime, a service monitor collects the performance metrics of federated services and dynamically adjusts the mediation/proxy configurations to maintain the QoS objectives specified by the federation architect.

The declarative nature of the mechanisms of the illustrative embodiments allows a federation architect to succinctly and precisely express the federation goal without resorting to low-level specification. The mechanisms save time and reduce possible errors. Also, the mechanisms of the illustrative embodiments described hereafter enable federation patterns to be created that can then be reused and applied easily when changes in the underlying service domains occur.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a distributed service-oriented data processing system, for declarative service domain federation, the method comprising:

receiving, in a planning engine executing on a processor of a federation server within the service-oriented data processing system, a federation intent declaration comprising a federation rule, a quality-of-service policy, and a service group definition, wherein the federation rule specifies a verb, a subject, an object, and an adverb, wherein the verb specifies an action, wherein the subject specifies a set of services, wherein the object specifies a set of service domains, and wherein the adverb specifies how the federation is to be carried out;

automatically identifying, by the planning engine, a set of services based on the service group definition;

automatically generating, by the planning engine, a service visibility configuration and one or more service proxies based on the federation rule and the quality-of-service policy, wherein the visibility configuration enables service consumers to interact with service providers residing in different service domains and wherein the one or more service proxies enable a service consumer in a first service domain within a plurality of service domains to access a service in a second service domain within the plurality of service domains;

automatically deploying, by the planning engine, the visibility configuration to the plurality of service domains comprising the identified set of services;

automatically deploying, by the planning engine, the one or more service proxies to execute within connectivity middleware executing on at least one processor of the plurality of service domains within the service-oriented data processing system;

collecting, by a service monitor, performance metrics of federated services at runtime; and dynamically adjusting the one or more service proxies to maintain quality-of-service objectives specified in the quality-of-service policy.

2. The method of claim 1, wherein identifying the set of services comprises:

querying service registries of the plurality of domains based on the service group definition.

3. The method of claim 1, wherein the service group definition is stored in a service group definition language.

4. The method of claim 1, wherein the service group definition specifies a service group by at least one of explicit enumeration, a query against a set of service properties, or a union or intersection of a plurality of other service groups.

5. The method of claim 4, wherein the set of service properties includes at least one of syntactic properties, semantic properties, or quality-of-service attributes.

6. The method of claim 1, wherein deploying the visibility configuration comprises generating entries in service registries of the plurality of service domains based on the service group definition.

7. The method of claim 1, wherein the federation rule is stored in a connectivity federation description language.

8. The method of claim 1, wherein the quality-of-service policy is stored in a Web services performance language that is compatible with an existing Web services policy framework.

9. The method of claim 1, wherein the quality-of-service policy describes quality-of-services capabilities by specifying service performance measurements collected by a runtime service monitoring engine and populated in a service registry of at least one service domain.

10. The method of claim 1, wherein the quality-of-service policy describes quality-of-service requirements that specify a set of service level assurance or optimization objectives.

11. A computer program product comprising a non-transitory computer readable storage medium having a computer readable program stored therein, wherein the computer readable program, when executed on a processor of a federation server within a service-oriented data processing system, causes the federation server to:

receive, in a planning engine executing on the processor of the federation server within a service-oriented data processing system, a federation intent declaration comprising a federation rule, a quality-of-service policy, and a service group definition, wherein the federation rule specifies a verb, a subject, an object, and an adverb, wherein the verb specifies an action, wherein the subject specifies a set of services, wherein the object specifies a set of service domains, and wherein the adverb specifies how the federation is to be carried out;

automatically identify, by the planning engine, a set of services based on the service group definition;

automatically generate, by the planning engine, a service visibility configuration and one or more service proxies based on the federation rule and the quality-of-service policy, wherein the visibility configuration enables service consumers to interact with service providers residing in different service domains and wherein the one or more service proxies enable a service consumer in a first service domain within a plurality of service domains to access a service in a second service domain within the plurality of service domains;

automatically deploy, by the planning engine, the visibility configuration to the plurality of service domains comprising the identified set of services;

automatically deploy, by the planning engine, the one or more service proxies to execute within connectivity middleware executing on at least one processor of the plurality of service domains within the service-oriented data processing system;

collect, by a service monitor, performance metrics of federated services at runtime; and dynamically adjust the one or more service proxies to maintain quality-of-service objectives specified in the quality-of-service policy.

12. The computer program product of claim 11, wherein the service group definition specifies a service group by at least one of explicit enumeration, a query against a set of service properties, or a union or intersection of a plurality of other service groups.

13. The computer program product of claim 11, wherein the quality-of-service policy describes quality-of-services capabilities by specifying service performance measurements collected by a runtime service monitoring engine and populated in a service registry of at least one service domain.

14. The computer program product of claim 11, wherein the quality-of-service policy describes quality-of-service requirements that specify a set of service level assurance or optimization objectives.

15. A federation server within a service-oriented data processing system, comprising:

a processor; and a memory coupled to the processor, wherein the memory comprises a planning engine comprising instructions which, when executed by the processor, cause the processor to:

receive, in a planning engine executing on the processor of the federation server within a service-oriented data processing system, a federation intent declaration comprising a federation rule, a quality-of-service policy, and a service group definition, wherein the federation rule specifies a verb, a subject, an object, and an adverb, wherein the verb specifies an action, wherein the subject specifies a set of services, wherein the object specifies a set of service domains, and wherein the adverb specifies how the federation is to be carried out;

automatically identify, by the planning engine, a set of services based on the service group definition;

automatically generate, by the planning engine, a service visibility configuration and one or more service proxies based on the federation rule and the quality-of-service policy, wherein the visibility configuration enables service consumers to interact with service providers residing in different service domains and wherein the one or more service proxies enable a service consumer in a first service domain within a plurality of service domains to access a service in a second service domain within the plurality of service domains;

automatically deploy, by the planning engine, the visibility configuration to the plurality of service domains comprising the identified set of services;

automatically deploy, by the planning engine, the one or more service proxies to execute within connectivity middleware executing on at least one processor of the plurality of service domains within the service-oriented data processing system;

collect, by a service monitor, performance metrics of federated services at runtime; and dynamically adjust the one or more service proxies to maintain quality-of-service objectives specified in the quality-of-service policy.

16. The federation server of claim 15, wherein the service group definition specifies a service group by at least one of explicit enumeration, a query against a set of service properties, or a union or intersection of a plurality of other service groups.

17. The federation server of claim 15, wherein the quality-of-service policy describes quality-of-services capabilities by specifying service performance measurements collected by a runtime service monitoring engine and populated in a service registry of at least one service domain.

18. The federation server of claim 15, wherein the quality-of-service policy describes quality-of-service requirements that specify a set of service level assurance or optimization objectives.

19. The computer program product of claim 11, wherein identifying the set of services comprises:

querying service registries of the plurality of domains based on the service group definition.

20. The computer program product of claim 11, wherein the service group definition is stored in a service group description language, wherein the federation rule is stored in a connectivity federation description language, and wherein the quality-of-service policy is stored in a Web services performance language that is compatible with an existing Web services policy framework.

21. The federation server of claim 15, wherein identifying the set of services comprises:

querying service registries of the plurality of domains based on the service group definition.

22. The federation server of claim 15, wherein the service group definition is stored in a service group description language, wherein the federation rule is stored in a connectivity federation description language, and wherein the quality-of-service policy is stored in a Web services performance language that is compatible with an existing Web services policy framework.

* * * * *